(12) United States Patent
Flake et al.

(10) Patent No.: US 8,082,518 B2
(45) Date of Patent: Dec. 20, 2011

(54) SCROLLABLE AREA MULTI-SCALE VIEWING

(75) Inventors: Gary Flake, Bellevue, WA (US); Donald James Lindsay, Mountain View, CA (US); Jeffrey Jon Weir, Seattle, WA (US); Brett Brewer, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 776 days.

(21) Appl. No.: 12/200,935

(22) Filed: Aug. 29, 2008

(65) Prior Publication Data

US 2010/0058226 A1    Mar. 4, 2010

(51) Int. Cl.
*G06F 3/048* (2006.01)
(52) U.S. Cl. ............ 715/786; 715/785; 715/800
(58) Field of Classification Search .......... 715/786, 715/785, 800, 973
See application file for complete search history.

(56) References Cited

U.S. PATENT DOCUMENTS

| | | | |
|---|---|---|---|
| 5,553,225 A | 9/1996 | Perry | |
| 5,880,722 A | 3/1999 | Brewer et al. | |
| 7,423,660 B2 * | 9/2008 | Ouchi et al. | 345/684 |
| 7,934,169 B2 * | 4/2011 | Reponen | 715/833 |
| 2002/0051069 A1 | 5/2002 | Inagaki | |
| 2003/0204317 A1 | 10/2003 | Loraine et al. | |
| 2005/0068342 A1 | 3/2005 | Ouchi et al. | |
| 2006/0136836 A1 * | 6/2006 | Clee et al. | 715/781 |
| 2006/0190833 A1 | 8/2006 | SanGiovanni et al. | |
| 2008/0034316 A1 | 2/2008 | Thoresson | |
| 2008/0141165 A1 | 6/2008 | Feig et al. | |

FOREIGN PATENT DOCUMENTS

WO    2008015504 A2    2/2008

OTHER PUBLICATIONS

Schoor, et al, "Automatic Zoom and Pseudo Haptics to Support Semiautomatic Segmentation Tasks", WSCG 2008 Conference Proceedings, pp. 8.
Igarashi, et al,"Speed-Dependent Automatic Zooming for Browsing Large Documents", Retrieved at <<http://research.microsoft.com/users/kenh/papers/AutoZoom-uist2000-final.PDF>>, pp. 10.
Bjork, et al, "An Alternative to Scrollbars on Small Screens", Retrieved at <<http://citeseer.ist.psu.edu/cache/papers/cs/13820/http:zSzzSzwww.viktoria.informatik.gu.sezSzgroupszSzplayzSzpublicationszSz1999zSzscrollbars.pdf/bjrk99alternative.pdf>>, pp. 2.

(Continued)

*Primary Examiner* — Ting Lee

(57) ABSTRACT

Utilizing a scrollbar handle for both zooming and panning a display comprising items in a user interface may be accomplished by monitoring an input device's interaction with the scrollbar handle. If the scroll handle is dragged in a direction away from an orientation of the scroll handle in the scrollbar, a display area zoom function can be activated. The zoom function allows a viewbox, comprising content, to be rescaled as a function of the distance the scroll handle is dragged. A displaybox can be created that distinguishes an area of the viewbox from the remainder of the display, which corresponds to content in the viewbox that would be displayed in normal zoom if the scroll handle were released at that location. Further, upon detecting that the scroll handle is released, the display area can zoom to a view of the content inside the distinguished area.

20 Claims, 11 Drawing Sheets

OTHER PUBLICATIONS

Jones, et al, "An Evaluation of Integrated Zooming and Scrolling on Small-Screens", Retrieved at <<http://people.cs.uct.ac.za/~gaz/papers/RevisedVersion1.1.pdf>>, Dec. 2003, pp. 1-26.

Bederson, "Zoomable User Interfaces for the Authoring and Delivery of Slide Presentations", Retrieved at <<http://hcil.cs.umd.edu/trs/2003-41/2003-41.html>>, Jul. 15, 2008, pp. 1-166.

Appert, et al, "OrthoZoom Scroller: 1D Multi-Scale Navigation", Retrieved at <<http://insitu.Iri.fr/~fekete/ps/OrthoZoom.pdf>>, Apr. 22-28, 2006, Montreal, Canada, pp. 1-10.

International Search Report from related PCT Application No. PCT/US2009/053918 dated Feb. 25, 2010.

"European Search Report", Date: Jul. 26, 2011, Application No. EP/09810450, pp. 7.

* cited by examiner

SCROLLABLE AREA MULTI-SCALE VIEWING

BACKGROUND

In a computing environment, data items may be stored and displayed in a variety of techniques. Commonly, user interface (UI) elements display data items as lists, grids, trees, browser pages, images, and videos, or a combination of these, for example. These UI elements can contain many data items, or very large items (e.g., images), but may only be able to display a small fraction of the item(s) on a computer screen at one time, for example. Typically, UI elements use a scrollbar along the horizontal and vertical axes to enable a user to pan around a view of items or one large item. Further, a user can often zoom out to view more of the content in the UI element, or zoom in to view more detail of the content in the UI element.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In a computing environment, user interface (UI) elements can contain one or more items that may be displayed on a computer display screen, for example. Examples of common element control displays for viewing items in the UI element include list-views, grid-views, tree-views, images, videos, text-views, browser pages, and combinations of these. While a UI element may contain many data items or one large item, for example, a computer system may only be able to display a portion of the item(s) at any one time.

Typically, users may use one or more scrollbars along the horizontal and vertical axes to pan around a display of the item(s) to view more of the content. Further, a user may be able to zoom out to view more content of the item(s) (e.g., while a typical display may show 20 items a user may zoom out to see 100 items of the content in the UI element in the display). Additionally, a user may be able to zoom in to view more detail of the content in the UI element (e.g., a user may wish to view greater detail of an area of an image, or see text in a larger font size).

Currently, typical panning and zooming functions are controlled by separate operations of a UI element. For example, a user can pan around the content in the display using one function (e.g., using the scrollbar(s)), but activates a second function in order to zoom in or out of the display (e.g., presses a control key on a keyboard while rotating a wheel on a mouse).

As provided herein, techniques and systems are disclosed for multi-scale viewing of a scrollable area in a display, utilizing one or more scrollbars for zooming and panning the scrollable area. Input device events can be monitored to monitor a user's interaction with one or more scrollbars in the scrollable display. If monitoring detects that a user drags a scroll handle on the scrollbar (e.g., down clicks on the scroll handle and moves the cursor without up clicking), orthogonal to the scrollbar's orientation (e.g., in a direction that is not along the scrollbar's orientation), a display area zoom function can be activated. Activating the display area zoom function can comprise adjusting a scale of a viewbox area of the display (e.g., an area in the display with viewable content). An amount of scale adjustment can be a function of an orthogonal distance the scroll handle is dragged from the scrollbar.

In one embodiment, if the scroll handle is dragged away from the scrollbar, toward a center of the display, the display can zoom out to show more content in the display. Further, in this embodiment, if the scroll handle is dragged toward the scrollbar, away from the center of the display, the display can zoom in to show more details of the content in the display. In another embodiment, if the scroll handle is dragged away from the scrollbar and away from the center of the display (e.g., beyond the scope of or outside of a shrunken/un-maximized window), the display can zoom in to show less content, but more details of the content in the display. Further, in this embodiment, if the scroll handle is dragged back toward the center of the display, the display can zoom out to show more content in the display. Additionally, in another embodiment, the display zooming function can be reversed from those described above. For example, zooming in to show less content (but more detail) can be performed when dragging the scroll handle toward the center of the display, and zooming out can be performed to show more content (but less detail) when dragging the scroll handle away from the center of the display.

Additionally, If monitoring detects that a user drags a scroll handle on the scrollbar orthogonal to the scrollbar's orientation, a new displaybox function can be activated, which distinguishes an area of the display (e.g., creates a shaded or translucent box around content in the viewbox) corresponding to an area of the viewbox that would be displayed upon releasing the dragged scroll handle (e.g., upon releasing the handle the display will zoom in to a viewbox area covered by the distinguished area). Also, activating the new displaybox function can comprise changing a scale of the distinguished area as a function of the zoom level of the viewbox content (e.g., as the viewbox is scaled to include more content, the distinguished area scales proportionally).

If the monitoring detects that the scroll handle has been released by the user (e.g., the user up clicks), the display can be changed to correspond to the area of the viewbox covered by the distinguished area. For example, the display can zoom into the content of the viewbox that is covered by the distinguished area.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
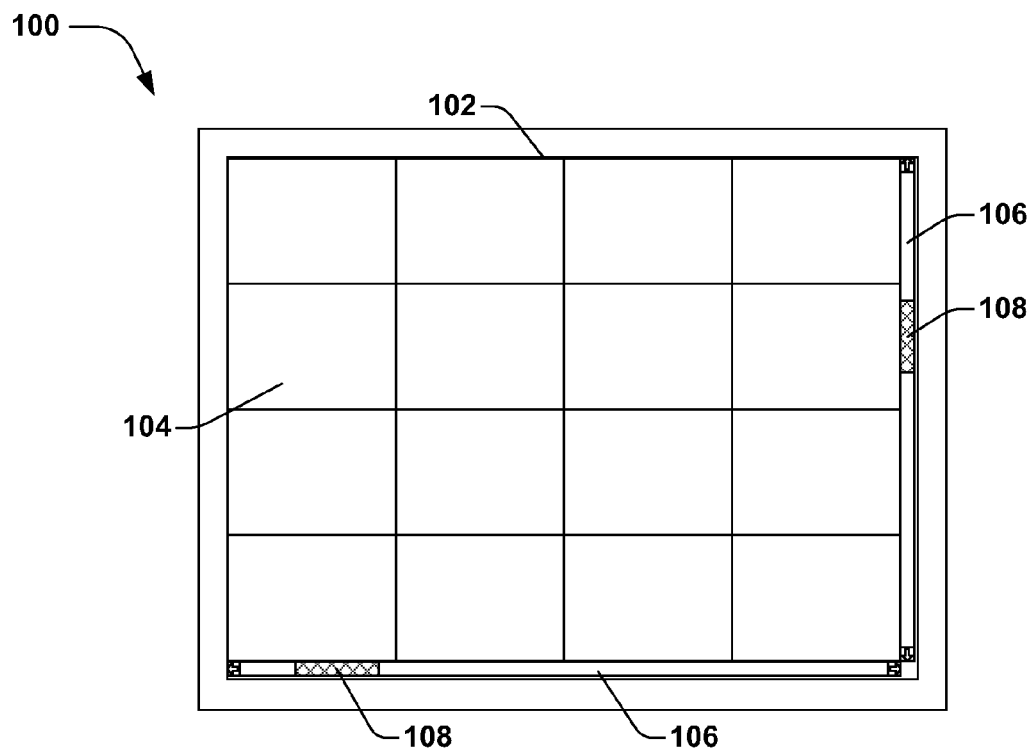
FIG. 1 is an illustration of an exemplary user interface with a scrollable display.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

FIG. 1 is an illustration 100 of an exemplary user interface (UI) with a scrollable display 102. As an example, a UI element may contain more items than can fit on a display in a normal view, as pre-determined by the user or default settings of the UI, thereby requiring a scrollable display for panning to view others items in the UI. In this example, the viewable portion of the contents 104 of the UI element are shown in a grid-view, however scrollable displays can be used in a variety of UIs for a variety of items. Further, this exemplary UI element comprises scrollbars 106 that can be used to pan the display around the contents in the UI element, in order to view contents that don't fit into the normal view of the display. The scrollbars 106 can comprise scrollbar handles 108 that may show the user a location of the viewed content 104 within the contents of the UI element. By dragging the scrollbar handles 108, a user can also pan the display 102 about the contents 104 to view other items in the UI element.

Figure 2:
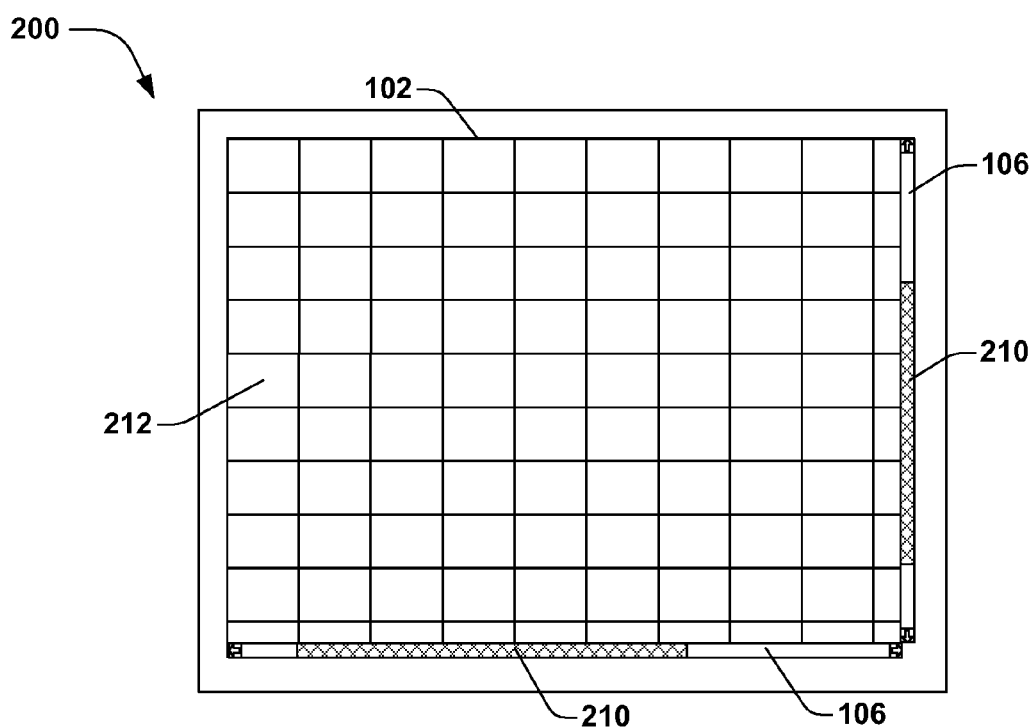
FIG. 2 is another illustration of an exemplary user interface with a scrollable display.

FIG. 2 is another illustration 200 of the exemplary user interface (UI) with the scrollable display 102. In this example, the scrollable display still comprises scrollbars 106 in both the horizontal and vertical axes, which can be used to pan the display over the content in the UI. However, this UI displays zoomed out content 212, which can be a result of a zooming function activated by the user and then zoomed out to display more content 212, for example. Further, in this example, as the display 102 is zoomed out to display more content 212 scrollbar handles 210 will typically increase in size, proportionally to the zoom level. In this way, a user can estimate how much of the content 212 is shown in the display 102.

In one aspect, as an example, a user viewing content in a user interface (UI) that does not all fit into a display may wish to pan the display around the content to view other content not on the display. However, if the content is large, a user may wish to zoom out the display to include more content, for example, in order to find an area of the content to display. In this example, the user can then zoom in the display to include more detail of the content in the area to which the display was panned.

Figure 3:
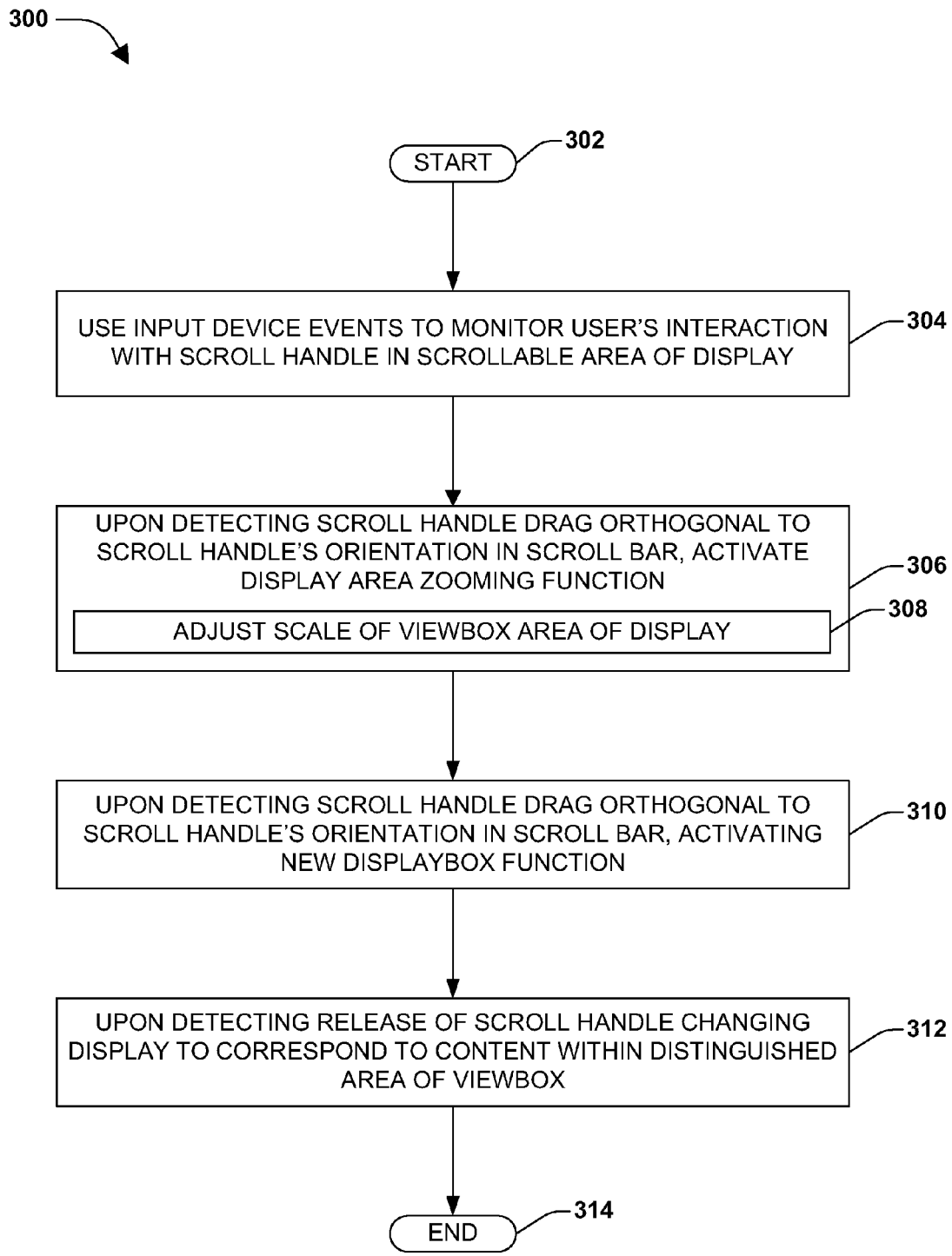
FIG. 3 is a block flow diagram of an exemplary method for multi-scale viewing of a scrollable area in a display.

FIG. 3 is a block flow diagram of an exemplary method 300 for multi-scale viewing of a scrollable area in a display, utilizing a scrollbar for zooming and panning the scrollable area. The exemplary method 300 begins at 302 and involves using input device events monitoring to monitor a user's interaction with a scroll handle in a scrollable area of a display, at 304. As an example, user interface (UI) elements coded with JavaScript can utilize mouse events to monitor a user's movements and activities within the UI element. In this example, if a user were to use a mouse to down click (e.g., mousedown) on the scroll handle in a scrollbar, then move the mouse away (e.g., mouseout) from the scrollbar without releasing the mouse button used to down click, mouse events can detect that the user has dragged the scroll handle away from the scrollbar. It will be appreciated that, while a mouse is a common input device for interacting with UI elements, the techniques and systems described herein are not limited to this embodiment. Many and varied input devices may be devised by those skilled in the art, such as, touch screens, touch sensitive pads, input keys, and others.

Figure 6:
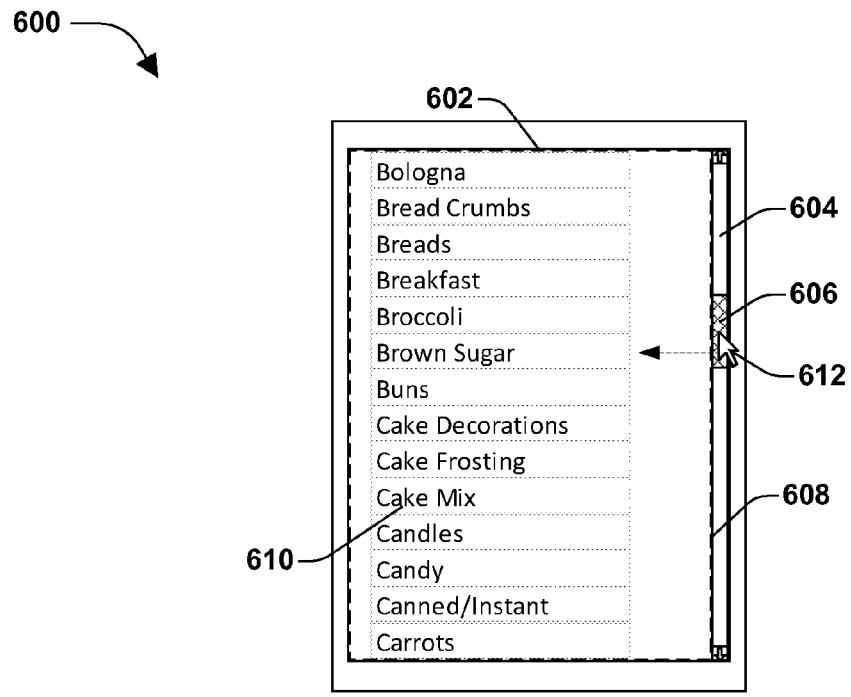
FIG. 6 is an illustration of an exemplary display showing a vertical list-type view of a scrollable display.

In the exemplary method 300, at 306, a display area zooming function is activated upon detecting a scroll handle drag orthogonal to the scroll handle's orientation in the scrollbar. As an example, if the input device events monitoring detects that the scroll handle, which is oriented vertically (e.g., oriented to scroll up and down a display) in the display, is dragged horizontally away from the scrollbar, the display area zooming function is activated. At 308, activating the display area zooming function can comprise adjusting a scale of a viewbox area of the display. For example, a viewbox area can comprise an area of the display that has contains UI element content. FIG. 6 is an illustration 600 of an exemplary display showing a vertical list-type view of a scrollable display 602. In this example, the viewbox 608 contains a list of items 610 in the UI element. It will be appreciated that, while the figures showing illustrations of a viewbox comprise an outline defining boundaries of the viewbox, the techniques and systems described herein are not limited to these embodiments. The outlines are used for clarity purposes only, and are not intended to create limitations herein.

Figure 4:
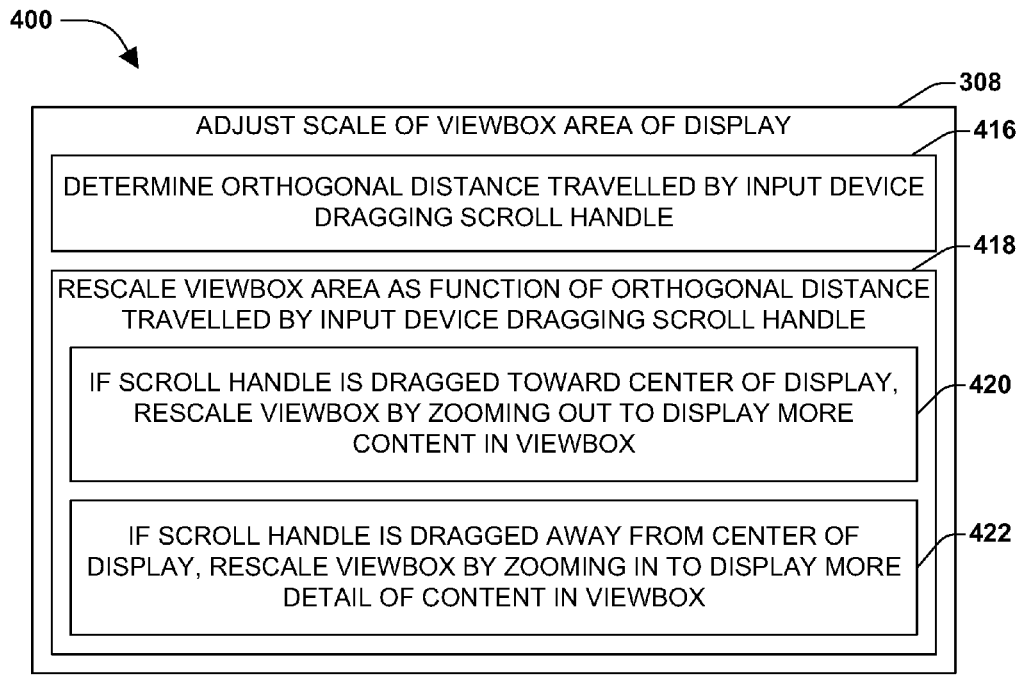
FIG. 4 is a block diagram illustrating a portion of an exemplary method for multi-scale viewing of a scrollable area in a display.

FIG. 4 is a block diagram 400 illustrating the adjusting the scale of the viewbox area of the display 308 portion of the exemplary method 300 for multi-scale viewing of a scrollable area in a display. At 416, an orthogonal distance travelled by the input device dragging the scroll handle is determined. For example, in FIG. 6, a user may use a mouse 612 (e.g., represented by a cursor) to drag a scroll handle 606 in a direction orthogonal to the orientation of the scroll handle 606 in the scrollbar 604. In this example, mouse events monitoring can be used to determine how far the mouse 612 moved while dragging the scroll handle 606.

Turning back to FIG. 4, at 418, adjusting the scale of the viewbox area of the display 308 can comprise resealing the viewbox area as a function of the orthogonal distance travelled by the input device dragging the scroll handle. For example, as described above, the orthogonal distance travelled can be determined, and the viewbox can be scaled proportionally to the distance. It will be appreciated that scaling of the viewbox can involve changing a size and shape of the viewbox to accommodate a size and shape of UI element content to be displayed inside the viewbox.

At 420, resealing the viewbox involves zooming out to display more content, if the scroll handle is dragged toward a center of the display. As an example, as the distance the scroll handle is dragged toward the center of the display increases, the level of zooming out and an amount of content displayed inside the viewbox increases. In this example, the viewbox can change its size and shape to accommodate the increased amount of content (e.g., in a list-view, as the zoom out level increases, the view of the list will grow longer and thinner, so the viewbox can change in length and width).

At 422, resealing the viewbox involves zooming in to display more details of the content (e.g., less amount of content, with more details), if the scroll handle is dragged away from the center of the display. As an example, as the distance between the center of the display and the dragged scroll handle increases, the level of zooming in, and the amount of details of the content displayed inside the viewbox increases. In this example, zooming in to the content allows a viewer to see more details of the content (e.g., larger font for text), while reducing an amount of content (e.g., less words) displayed in the viewbox. Further, this can be extended to the situation where the user interface window is shrunk or not maximized, in which case the scroll handle can be dragged past the scroll bar and out beyond the window to continue zooming in to see more details (e.g., to achieve greater than 100% zoom).

Figure 5:
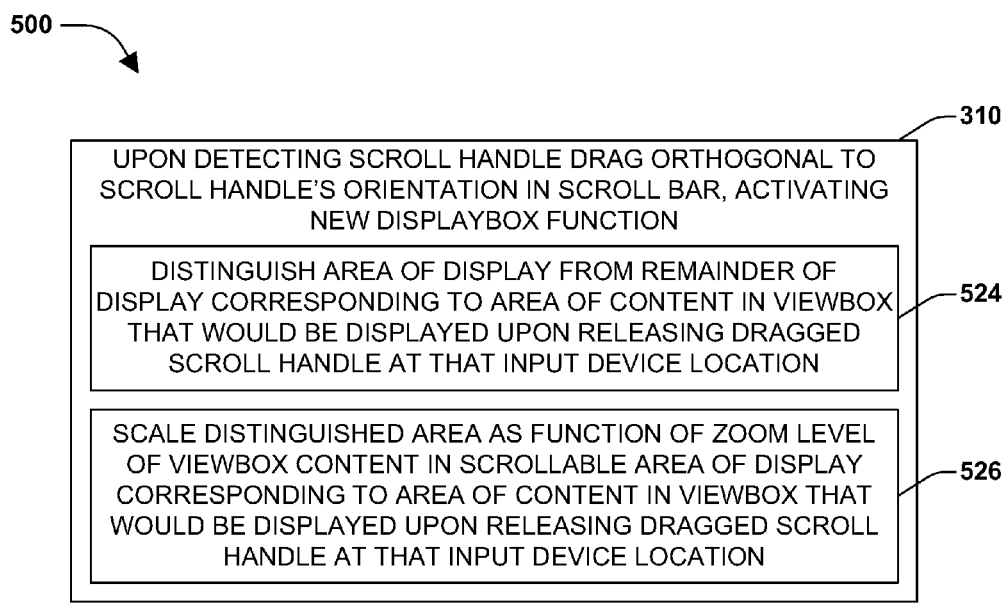
FIG. 5 is a block diagram illustrating a portion of an exemplary method for multi-scale viewing of a scrollable area in a display.

Turning back to FIG. 3, at 310, the exemplary method 300 activates a new displaybox function upon detecting a scroll handle drag orthogonal to the scroll handle's orientation in the scrollbar. FIG. 5 is a block diagram 500 illustrating the activating the new displaybox function 310 portion of the exemplary method 300 for multi-scale viewing of a scrollable area in a display. At 524, an area of the display is distinguished from a remainder of the display, which corresponds to an area of content in the viewbox that would be displayed upon releasing the dragged scroll handle at the location of the input device. As an example, when the display area zooming function is activated 306, upon detecting that the scroll handle has been dragged toward the center of the display, away from the scrollbar, the viewbox can display a zoomed out portion of the content in the UI element. In this example, upon detecting that the scroll handle has been dragged toward the center of the display, away from the scrollbar, a shaded or translucent box can be displayed over that portion of the scaled viewbox that corresponds to what will be displayed upon releasing the scroll handle (e.g., the display can zoom back in to the normal view of the content upon releasing the handle).

At 526, activating the new displaybox function 310 can comprise scaling the distinguished area (e.g., shaded box) as a function of the zoom level of the viewbox content in the scrollable area of the display corresponding to an area of content in the viewbox that would be displayed upon releasing the dragged scroll handle at that input device location. For example, as the zoom level of the content in the viewbox changes, the size of the distinguished area can change to correspond to the area of the content that will be displayed when the scroll handle is released. In this example, as the viewbox is zoomed out to show more content, the distinguished area, such as a shaded box over the viewbox, will decrease in size proportionally to the zoom level in the viewbox. In this way, for example, a user can determine what will be displayed in normal view by seeing what portion of the content the shaded box covers during zooming and panning.

Turning again back to FIG. 3, at 312, the exemplary method 300 changes the display to correspond to the content within the distinguished area of the viewbox, upon detecting a release of the scroll handle. As an example, if mouse events are used to monitor a user's interaction with the scroll handle, when the user up clicks (e.g., mouseup), this action can release the scroll handle from its drag condition (e.g., while the user kept a mouse button depressed and was moved away from the scrollbar the scroll handle was in a drag condition). In this example, upon mouse events detecting the scroll handle's release, the area of content in the viewbox that was covered by the distinguished area (e.g. shaded box), as the scroll handle was released, can be displayed in normal zoom level view (e.g., the viewbox can zoom in to the content to display an extent of content in the distinguished area).

Having changed the display to correspond to the content within the distinguished area of the viewbox, the exemplary method 300 ends at 314.

It will be appreciated that, while the zooming functions have been described to zoom out when dragging a scroll handle toward a center of the display, and zooming in when dragging the scroll handle away from the center of the display, the methods and systems described herein are not limited to this description. In another embodiment, the zooming functions may be reversed. For example, the display may be zoomed in when dragging the scroll handle toward the center of the display, showing less content, but more detail. Similarly, the display may be zoomed out when dragging the scroll handle away from the center of the display, showing more content, but less detail. However, in this embodiment, if the display is zoomed in when the scroll handle is dragged toward a center of the display, the new displaybox function may not be activated.

In one embodiment, a scrollable display area of a user interface (UI) element may comprise a list-type view of items. As an example, a text-based list of items may comprise individual items that can fit in a normal view (e.g., default view or customized user view) of the display. However, in this example, all of the items in the list may not be able to be displayed at one time in the normal view. In this case, a scrollbar can be displayed along a vertical axis of the display, as described above, to enable a user scroll through the list in the normal view, for example. FIG. 6 is an illustration 600 of an exemplary display showing a vertical list-type view of a scrollable display 602.

In this example, content in the scrollable display 602 comprises a text-based list of groceries 610. A viewbox 608 comprises viewable content 610 (e.g., UI element content that can fit into the display in the current view), which, in this example, because the display is shown in normal view (e.g., default view or a user customized view), comprises the extent of the display area (e.g., the area that can display content, not including a scrollbar). Further, a user can click down on a scroll handle 606 (e.g., mousedown) in the vertical scrollbar 604, and drag the cursor 612 (e.g., move the cursor after a mousedown and before a mouseup event) in a direction away from the scroll handle (e.g., mouseaway). In this embodiment, as described above, dragging the scroll handle orthogonally from an orientation of the scroll handle in the scrollbar (e.g., dragging the handle horizontally from a vertical scrollbar) can activate the display area zooming function, and the new displaybox function.

Figure 7:
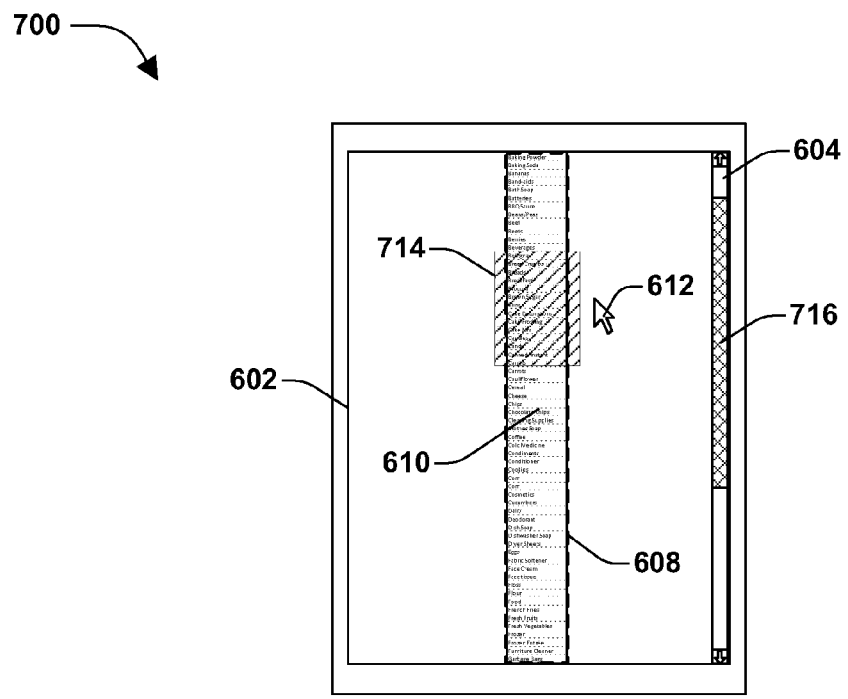
FIG. 7 is an illustration of an exemplary display showing an exemplary zoom function for a vertical list-type view of a scrollable display.

FIG. 7 is another illustration 700 of an exemplary display showing an exemplary zoom function for a vertical list-type view of a scrollable display 602. In this example, the scrollable display 602 is shown after the display area zooming function and the new displaybox function have been activated. As the cursor 612 is dragged orthogonally to the scroll handle's orientation, the viewbox 608 is scaled (e.g., changed in size and shape) to accommodate a zoomed out view of the content 610 of the UI element, for example. Further, in this example, a distinguished area 714 (e.g., a shaded box) has been created, which covers an area of the viewbox that corresponds to content that may be displayed in the scrollable display 602 if the scroll handle is released. Additionally, in this embodiment, the scroll handle 716 can be scaled in size, as is typical for a scrollbar function, in order to show the user how much of the content is displayed in the viewbox, for example.

Figure 8:
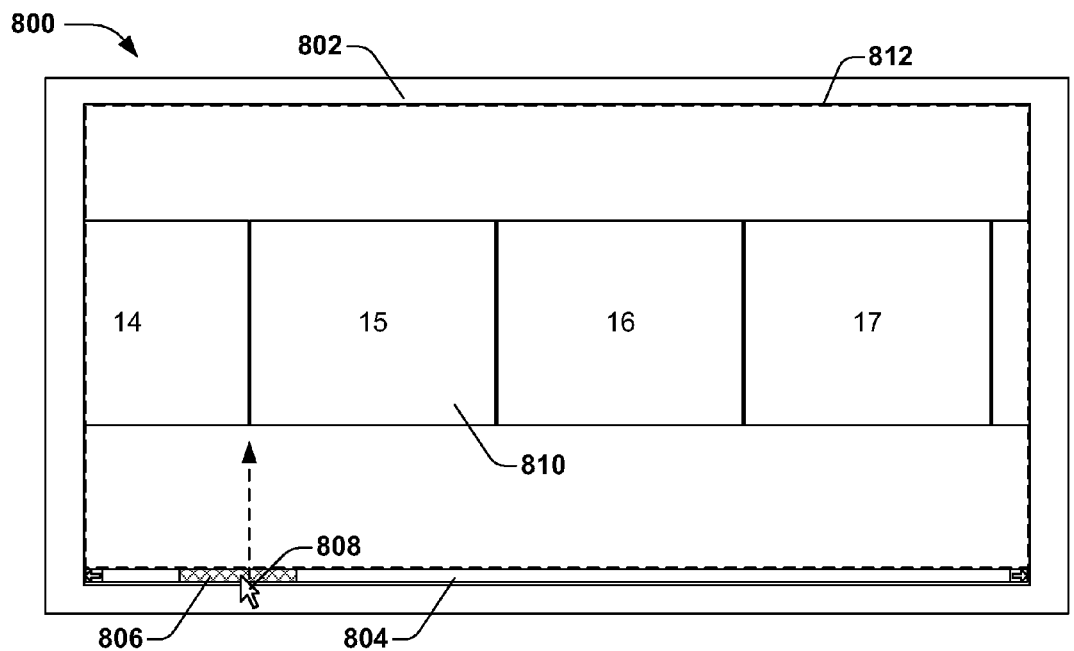
FIG. 8 is an illustration of an exemplary display showing a horizontal filmstrip-type view of a scrollable display.

In another embodiment, a scrollable display area of a user interface (UI) element may comprise a horizontal view of items, for example, a film-strip view of UI element items. FIG. 8 is an illustration of an exemplary display 800 showing a horizontal filmstrip-type view of a scrollable display. In this example the viewable contents 810 comprise a single horizontal row of frames (e.g., image frames of a photo album), and a scrollbar 804, comprising a scroll handle 806, is displayed along a horizontal axis of the display 802. As previously described, the viewbox 812 comprises an extent of the viewable display, because this is an example of a normal zoom view. In this example, when a user drags the scroll handle 806 upward using a cursor 808, which is orthogonal to the scroll handle's orientation, the display area zoom function and new display box function can be activated.

Figure 9:
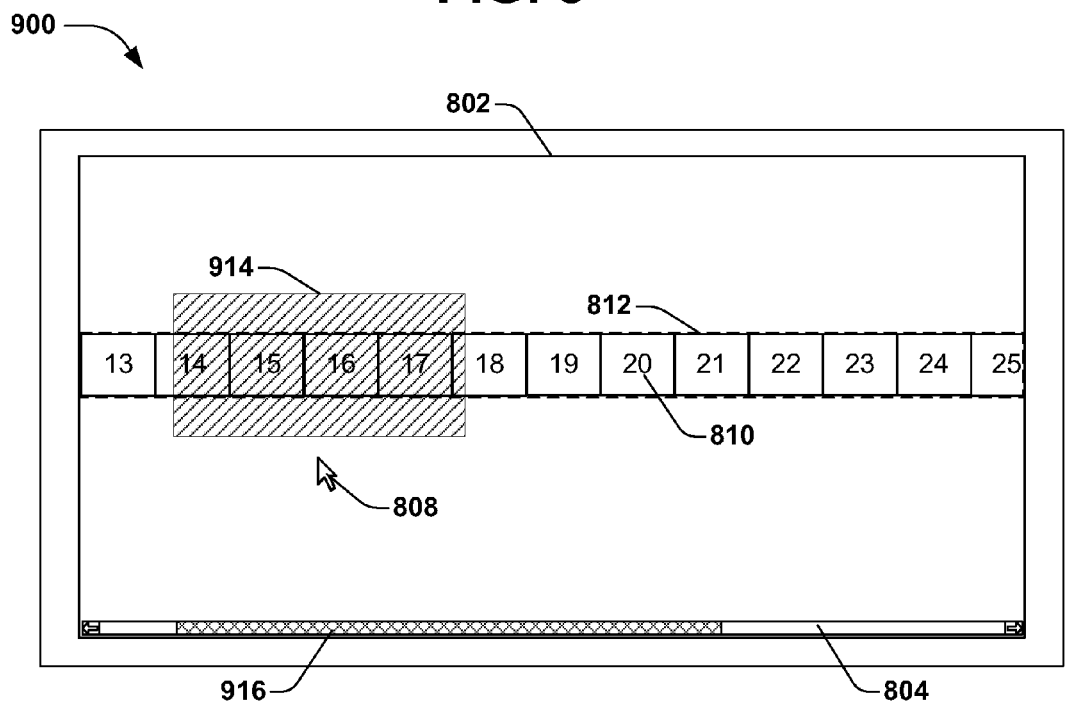
FIG. 9 is an illustration of an exemplary display showing an exemplary zoom function for a horizontal filmstrip-type view of a scrollable display.

FIG. 9 is another illustration 900 of an exemplary display showing an exemplary zoom function for a horizontal filmstrip-type view of a scrollable display. In this example the scrollable display 802 is shown after the display area zooming function and the new displaybox function have been activated. Again, as described above, as the cursor 808 is dragged away from the scroll handle 916, the viewbox 812 is scaled to accommodate a zoomed out view of the content 810. Further, in this example, a displaybox 914 is created over the content in the viewbox 812 that will be displayed when the scroll handle is released. Additionally, the scroll handle 916 has been scaled to help the user determine how much of the UI element content is being display in the viewbox 812.

Figure 10:
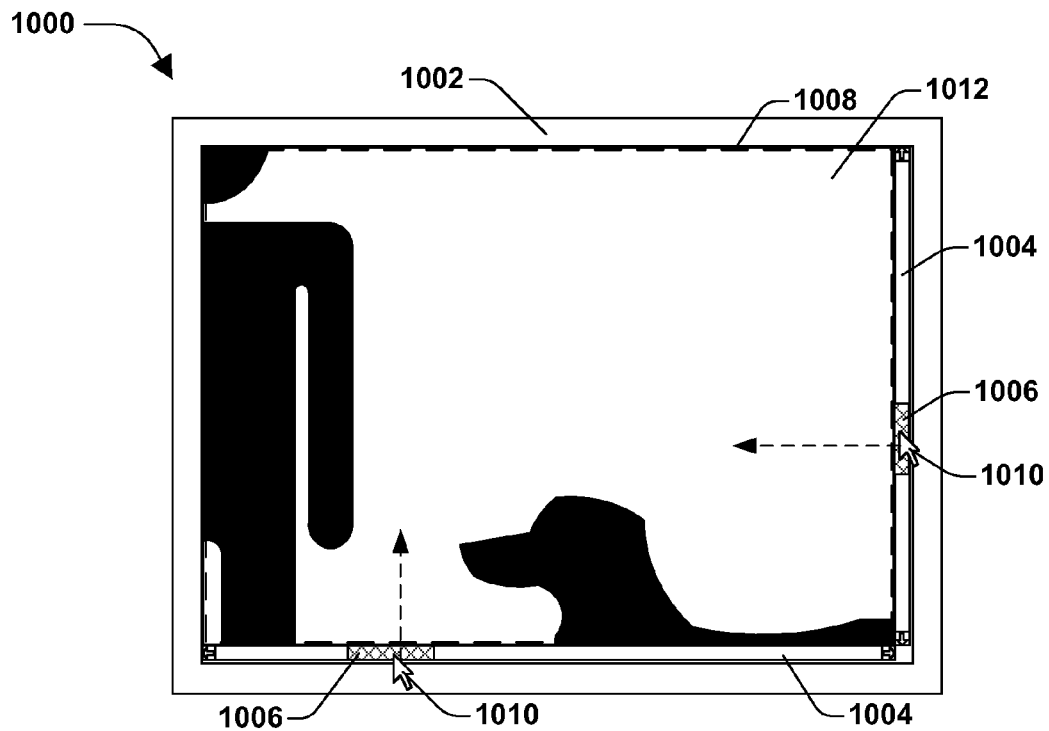
FIG. 10 is an illustration of an exemplary horizontal and vertical scrollable display showing an exemplary portion of an image.

In another embodiment, for example, a scrollable display area of a user interface (UI) element may comprise content that is a large item or series of items that don't fit into the display in a normal zoomed view (e.g., default view or user customized view), and have both a horizontal and vertical scrollbar for panning the display around the content. FIG. 10 is an illustration 1000 of an exemplary horizontal and vertical scrollable display 1002 showing an exemplary portion of an image, which comprises the content 1012 of the UI element. In this example, the image is larger than can normally fit in the display while zooming out, therefore the display 1002 comprises a horizontal and vertical scrollbar 1004 for panning around the content image 1012. Further, in this example, a viewbox 1008 comprises an extent of the viewable content in the scrollable display 1002, as described above, because this is an example of a normal zoomed view. A user may guide a cursor 1010 to either the horizontal or vertical scroll handles 1006 and drag them orthogonally to their respective orientations in the scrollbar 1004, for example. In this example, the dragging action can activate the display area zooming function and the new displaybox function.

Figure 11:
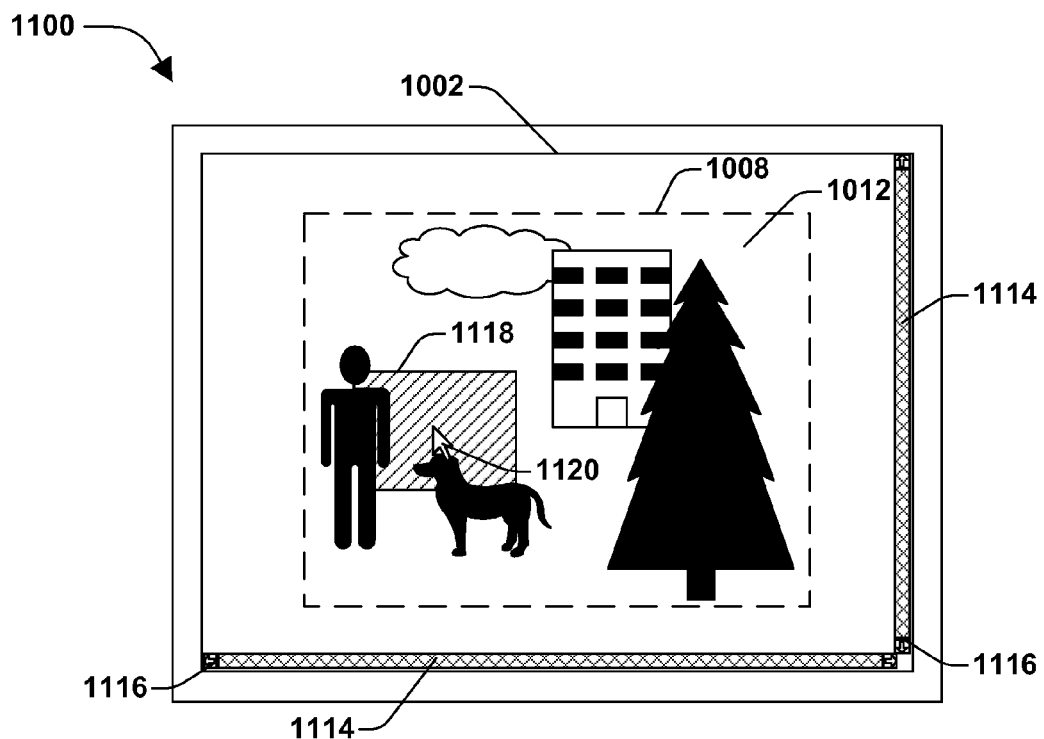
FIG. 11 is an illustration of an exemplary horizontal and vertical scrollable display showing an exemplary zoom function for an image view of a display.

FIG. 11 is an illustration 1100 of an exemplary horizontal and vertical scrollable display 1002 showing an exemplary zoom function for an image view of a display. This example illustrates the display area 1002 after a user has dragged one of the two scroll handles orthogonally to their respective orientations, and the display area zooming function and the new displaybox function have been activated. In this example, the viewbox 1008 has been scaled in size to accommodate an extent of the content 1012 in the UI element, in this case an image, showing a zoomed out view of the entirety of the content image 1012. Further, a distinguished area 1118 (e.g., shaded box) has been created, using the new displaybox function, which corresponds to an area of the image content 1012 that would be displayed if the user released the scroll handle at that location. In this example, the distinguished area corresponds to the content 1012 in FIG. 10.

Additionally, in this embodiment, for example, the distinguished area 1118 may be moved about the viewbox 1008 using an input device (e.g., mouse), and its location can correspond to a location of a cursor 1120 in the display 1002. Accordingly, the distinguished 1118 area can be "dragged" for example to cover the top of the pine tree (or any other desired portion of the content) so that this newly "highlighted" content would be displayed (e.g., in a zoomed in manner as illustrated in FIG. 10) when the input device (e.g., mouse button) is released. In one example, when the entirety of the content is visible due to the degree of zooming out, the content may become "locked" in this completely zoomed out view to facilitate "dragging" or otherwise moving the distinguished area around to designate or highlight a particular portion of the content. The variable zooming functionality would then be reinstituted when the input device is released. Also, in this example, the scroll handles 1114 have been scaled in size to show the user that the UI content is zoomed out to its extent.

In another aspect, when a user zooms out a displayed view in order to view more user interface (UI) content, the content may become difficult to differentiate. To facilitate content differentiation in a zoomed out view, a type of semantic zooming can be used. Semantic zooming can be incorporated into geometric zooming (e.g., changing the size/detail and amount of items), for example, whereby an index of the items in the UI content can be created and individual indexes can be inserted at locations in the content corresponding to an indexed item.

As an example, a list of text-based items can be arranged in alphabetical order. In this example, an index of this list may comprise letters of the alphabet. In normal view (e.g., a default or user customized view whereby the items are readable), the displayed portion of the list may comprise 20 items, however, as the view of the list is zoomed out to include more of the list the text can become indistinguishable. In one embodiment, for example, as the display is being zoomed out, letters of the alphabet corresponding to a first letter of the items can be inserted into the zoomed display at corresponding locations as index points. In this way, while the text may be difficult to differentiate, the user can use the indexes of the list to facilitate determining a location of items in the list, for example.

Figure 15:
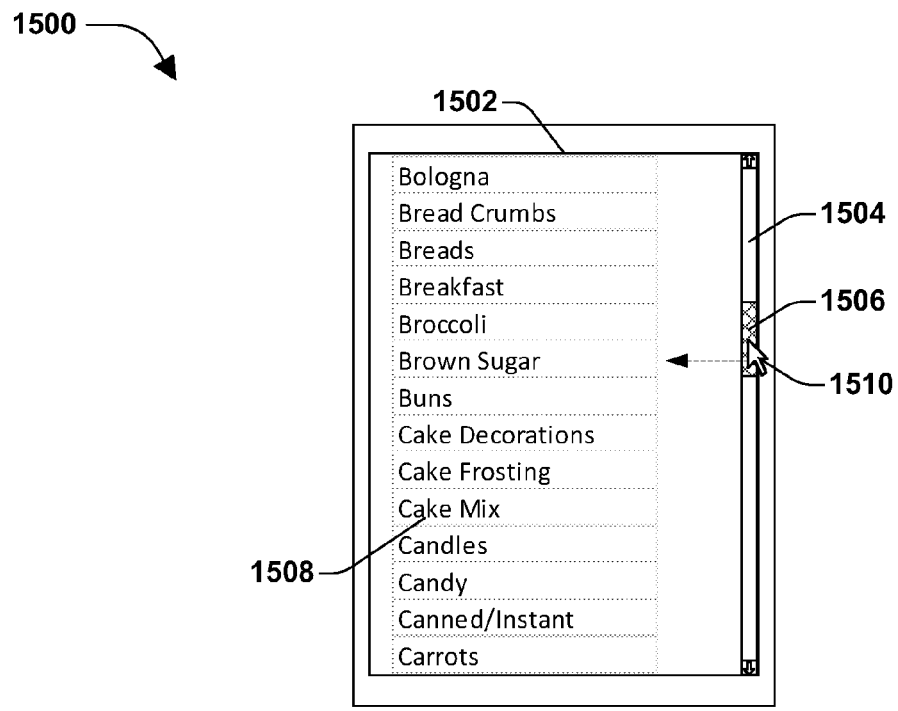
FIG. 15 is an illustration of an exemplary embodiment of semantic zooming.
Figure 15:
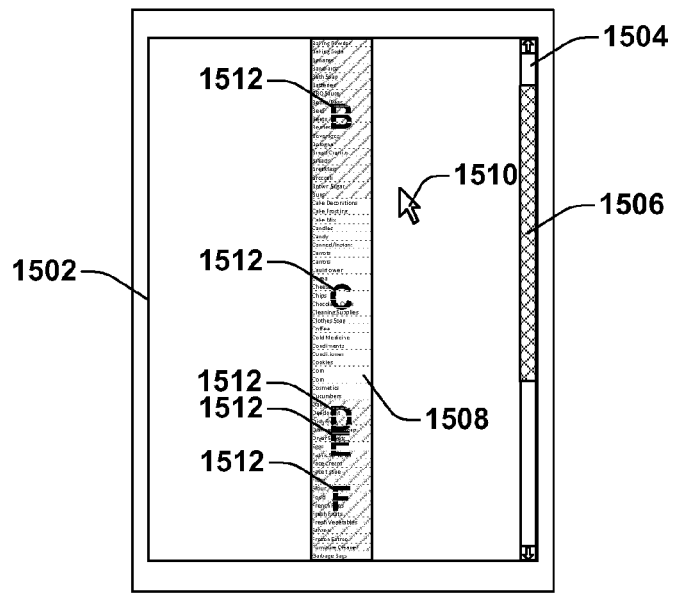

FIG. 15 is an illustration of an exemplary embodiment 1500 of semantic zooming. Using the techniques and systems described herein, in this exemplary embodiment 1500, a display 1502 shows a list of grocery items 1508 in a normal zoomed view (e.g., a default zoom level or user customized view). In this example, because the list of items does not fit in the display 1502 in the normal zoom view, a scrollbar 1504 and scroll handle 1506 are displayed in a vertical orientation. If a user moves a cursor 1510 orthogonally to the orientation of the scroll handle 1506 the content 1508 is zoomed out and an index 1512 corresponding to items in the list is displayed, in this example, over the area of the list starting with that letter of the alphabet. Such an index 1512 may comprise one or more different items, such as letters, numbers, avatars, thumbnail images, etc.

It will be appreciated that semantic zooming, as used by the techniques and systems described herein, is not limited to inserting letters or index points. Those skilled in the art may devise various ways to manipulate a view of UI element content in order to facilitate a user's ability to differentiate items during zooming. For example, a table of contents-type view may be used for large groups of items, that could include headings and page numbers inserted into the display as it is zoomed out. In another example, images, shading, or different colors can be used to differentiate items or groups of items.

In another aspect, as described above, a distinguished area can be created upon detecting a scroll handle drag orthogonal to the scroll handle's orientation, when zooming out to display more content. In one embodiment, the distinguished area may comprise a shaded or differently colored box in the display, which covers a portion of a viewbox in the display. In this embodiment, the portion of the viewbox covered by the shaded box corresponds to content in the viewbox that would be displayed upon release of the scroll handle drag at that location. In this aspect, if the zooming function is configured to zoom into the content to display more detail when the scroll handle is drag toward a center of the display, the displaybox function may not be activated.

Figure 13:
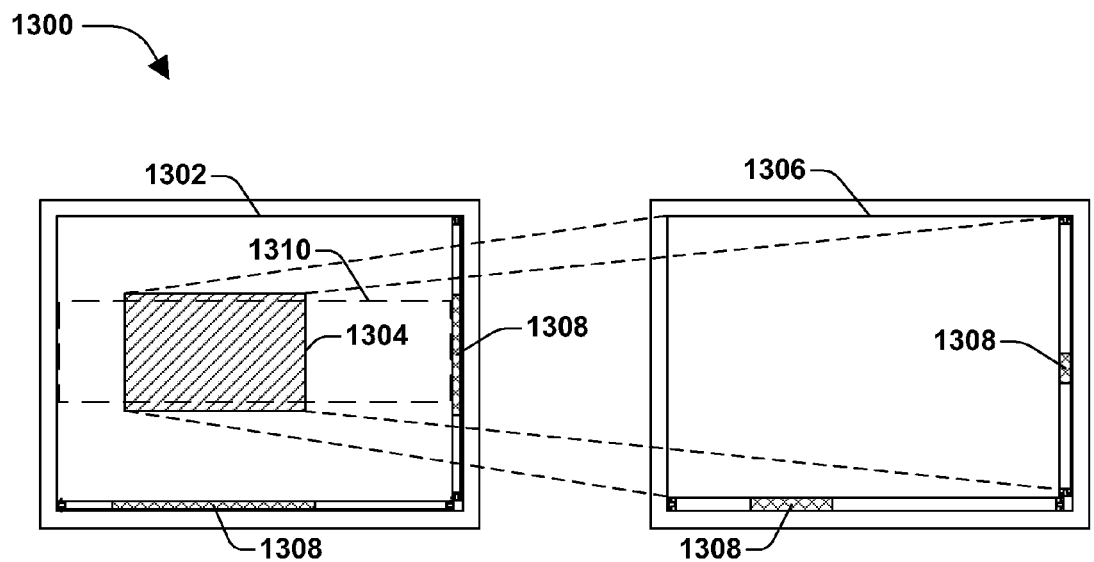
FIG. 13 is an illustration an exemplary distinguished area of a viewbox used in a display.

FIG. 13 is an illustration 1300 of an exemplary distinguished area 1304 of a viewbox 1310 used in a display. In this example, a shaded box covers a portion of the viewbox 1310 in the display 1302. As the viewbox 1310 is zoomed out to view more content, for example, the size and shape of the viewbox 1310 is scaled to accommodate its content and the size and shape of the shaded box 1304 is scaled proportionally. In this example, if a user, who has dragged a scroll handle 1308 orthogonally from its orientation, releases the scroll handle 1308, the display 1306 zooms in to the contents of the shaded box 1304, thereby displaying the area of the viewbox 1310 covered by the shaded box 1304.

In another aspect, in an effort to facilitate a user's ability to locate a portion of content in a user interface (UI) element, the content inside a distinguished area (e.g., a shaded box) of the viewbox can be displayed. For example, as described above, as a user drags a scroll handle orthogonally from its orientation in a scrollbar, a distinguished area, such as a shaded box, can be created over that portion of the viewbox that would be displayed if the user released the scroll handle at that location. In this example, the content of the viewbox that the shaded box covers can be displayed in the scrollable display area, behind the viewbox. In this way, a user may be able to identify a location of content in the viewbox they desire to view.

Figure 14:
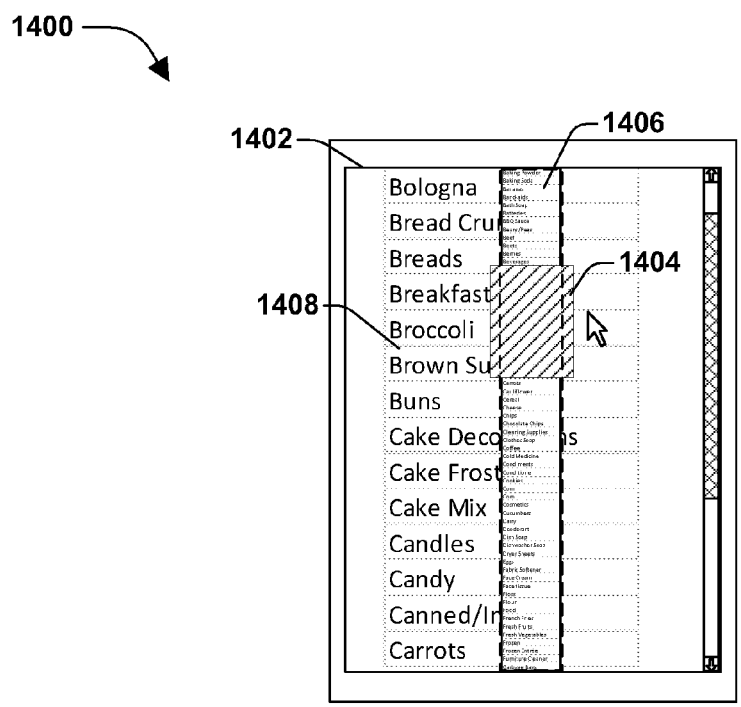
FIG. 14 is an illustration of an exemplary display utilizing contents of a viewbox.

FIG. 14 is an illustration 1400 of an exemplary display 1402 displaying contents 1408 of a viewbox 1406 covered by a distinguished area 1404. In this example, a shaded box 1404 distinguishes an area of the viewbox 1406, which contains UI element content. However, the content of the viewbox 1406 has been zoomed out, for example, and a user may not be able to distinguish the text. In this example, the display 1402 shows a view of the content 1408 that may be found inside the shaded box 1404 at that location of the viewbox 1406. In this way, for example, a user may be able to move the shaded box 1404 over the zoomed out viewbox 1406, to find content 1408 they wish to view.

Figure 12:
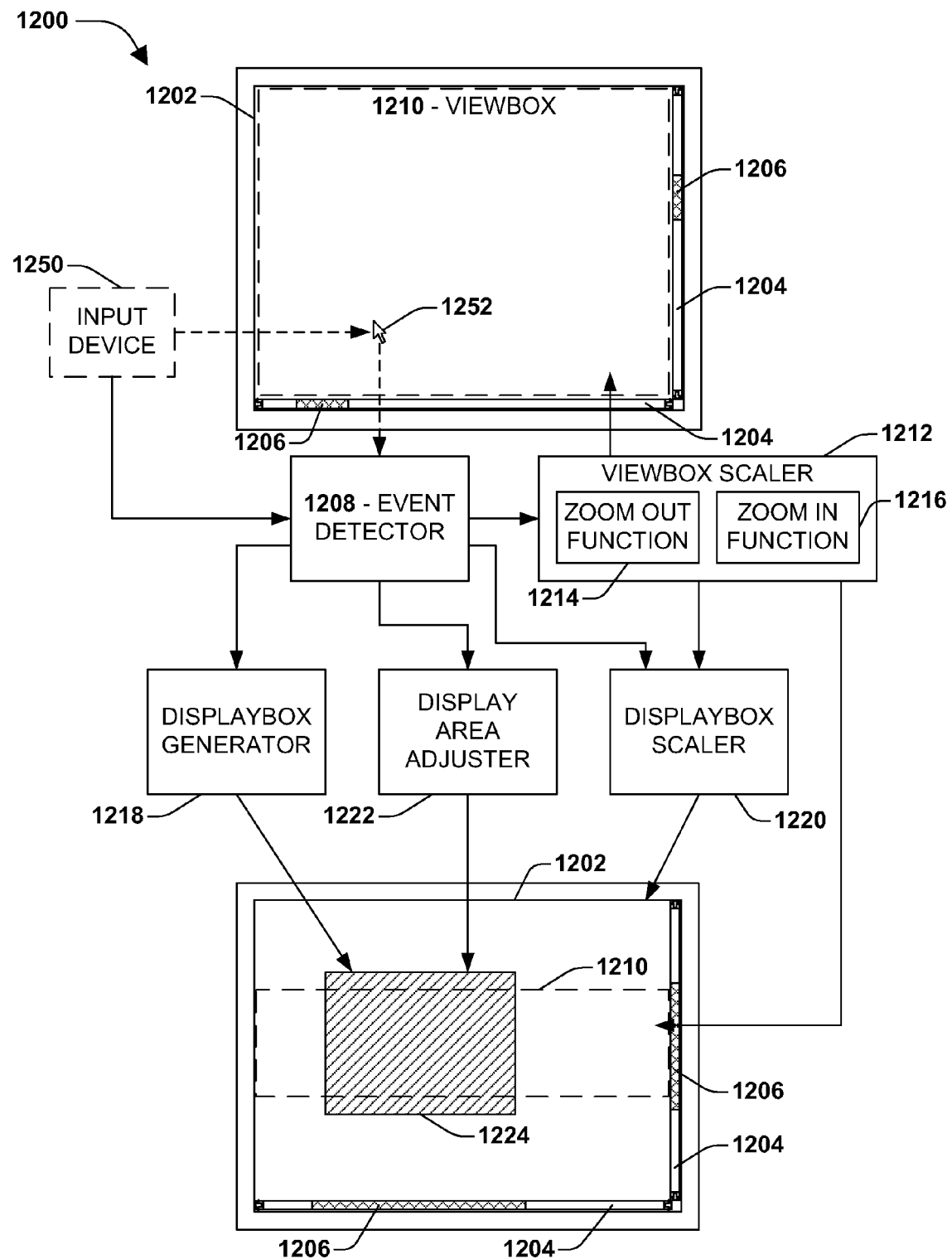
FIG. 12 is a component block diagram illustrating an exemplary system for multi-scale viewing of a scrollable area in a display.

A system may be devised for multi-scale viewing of a scrollable area in a display, utilizing a scrollbar for zooming and panning the scrollable area. FIG. 12 is a component block diagram illustrating an exemplary system 1200 for multi-scale viewing of a scrollable area in a display. In this embodiment, the exemplary system 1200 comprises an input device event detector 1208, which can be configured to detect input device 1250 related actions, such as those associated with a cursor 1252, in conjunction with a scrollable area in a display 1202. As an example, a user interface (UI) on a computer will commonly utilize a mouse as an input device 1250 to interact with controls and other display items in the UI element using a cursor 1252. In one embodiment, the input device event detector 1208, for example, may be a mouse events monitor that can detect mouse movements, actions (e.g., mouse clicks), and interactions with UI element controls.

Further, in this embodiment, the exemplary system 1200 comprises a zoomable viewbox 1210, which can be configured to be rescaled to accommodate UI content zooming. The zoomable viewbox 1210 can comprise content (e.g., items that may be displayed in the scrollable area of the UI element) of the scrollable area of the display 1202, and may be displayed in the scrollable area of the display 1202. In one embodiment, for example, when a scrollable display area 1202 is zoomed to a normal view (e.g., a default or user customized view, whereby the content in the display is distinguishable for a purpose for which it is intended) the viewbox 1210 can comprise an extent of the viewable area of the display 1202. Also, in this embodiment, when the content of the viewbox 1210 zoomed out to include more content, the viewbox 1210 is configured to be scaled in size and shape to accommodate a zoomed out view of the content.

Additionally, in this embodiment, the exemplary system 1200 comprises a viewbox scaler 1212, which may be operably coupled to the input device event detector 1208, and can be configured to rescale the zoomable viewbox 1210 as a function of an orthogonal distance of an input device 1250 scroll handle 1206 drag from an orientation of the scroll handle 1206. As an example, the viewbox scaler 1212 may receive scroll handle drag distance data from the event detector 1208, to determine how to rescale the zoomable viewbox 1210.

In this embodiment, the viewbox scaler 1212 comprises a zoom out function 1214, which can be configured to rescale the zoomable viewbox 1210 by zooming out to display more content in the viewbox 1210 if the scroll handle 1206 is dragged toward a center of the display 1202. Further, in this embodiment, the viewbox scaler 1212 comprises a zoom in function 1216, which can be configured to rescale the zoomable viewbox 1210 by zooming in to display more detail of the content in the viewbox 1210 if the scroll handle 1206 is dragged away from the center of the display 1202. As an example, if a user moves the cursor 1252 over a scroll handle 1206, using a mouse 1250, clicks down on the scroll handle 1206 and drags it away from the scrollbar 1204, the viewbox 1210 can be scaled in size and shape to accommodate more of the UI element content as a view of the content is zoomed out. Further, in this example, if the user then drags the mouse 1250 toward the scrollbar 1204, the viewbox 1210 can be rescaled to accommodate a view of more content detail.

The exemplary system 1200 further comprises a new displaybox generator 1218, which can be configured to generate a distinguished area 1224 of the display 1202 from the remainder of the display 1202, the distinguished area 1224 corresponding to an area of content in the viewbox 1210 that would be displayed upon releasing the dragged scroll handle 1206 at that input device 1250 (e.g., mouse cursor) location. In one embodiment, for example, when the viewbox 1210 is scaled to accommodate a zoomed view of the content, the new displaybox generator 1218 can create a distinguished area

1224, such as a shaded box, that corresponds to content in the viewbox 1210 that would be displayed in a normal view, as described above. In this embodiment, a location of the distinguished area can be a function of a location of the input device's cursor 1252, for example, as the event detector 1208 can send input device location information to the displaybox generator 1218 to allow an appropriate placement of the displaybox 1224.

The exemplary system 1200 further comprises a displaybox scaler 1220, which can be configured to rescale the distinguished area 1224 as a function of a zoom level of the viewbox content in the scrollable area of the display 1202, and can correspond to an area of content in the viewbox 1210 that would be displayed upon releasing the dragged scroll handle 1206 at that input device 1250 location. In one embodiment, for example, as the viewbox 1210 is scaled in size and shape to accommodate a zoomed view of the content in the UI element, the displaybox scaler 1220 can scale a size and shape of the displaybox 1224 so that is corresponds to content in the viewbox 1210 that would be displayed in a normal view, as described above. In this embodiment, the viewbox scaler 1212 can send data to the displaybox scaler 1220 that identifies a scale and zoom level of the viewbox 1210. Further, in this embodiment, for example, the event detector 1208 can send input device location information to the displaybox scaler 1220 to allow an appropriate placement of the displaybox 1224.

The exemplary system 1200, further comprises a display area adjuster 1222, which may be operably coupled to the input device event detector 1208, and can be configured to change the display area 1202 to correspond to the content within the distinguished area 1224 of the viewbox 1210 upon detection of a release of the scroll handle 1206. As an example, when a user releases the scroll handle 1206 (e.g., up clicks a mouse button), the event detector 1208 can pass information to the display area adjuster 1222 that the scroll handle 1206 has been released. In this example, upon receiving the release information the display area adjuster 1222 can zoom the display area 1202 to the content of the viewbox 1210 comprised in the distinguished area 1224. In this way, a user may choose the content they wish to view in a normal zoom by releasing the scroll handle drag at their chosen location, for example.

In one embodiment, the exemplary system may comprise a semantic zoomer, which can be configured to manipulate a view of content in a viewbox to facilitate visual differentiation of the content. In this embodiment, the semantic zoomer can be activated upon detection of the viewbox resealing to zoom out. As an example, as a view of content in the viewbox is zoomed out it may become indistinguishable. In this example, index pointers corresponding to index points in the content can be inserted in the viewbox at locations corresponding to the index points. In this way, a user may be able to discern a location in the content, even if the content itself is difficult to differentiate, for example.

In another embodiment, the exemplary system may comprise a display area that is configured to display contents of a distinguished area behind a viewbox. In this embodiment, the contents of the distinguished area can be displayed in normal zoom view, in the display area, behind the viewbox. In this way, for example, if a user is scrolling and zooming through a list of items, the contents of the list can be shown behind the viewbox in the display while the viewbox is zoomed out to a point where the contents may not be distinguishable. In this example, a user can more readily locate content in the viewbox even when zoomed out to a point where the content in the viewbox is difficult to distinguish.

Figure 16:
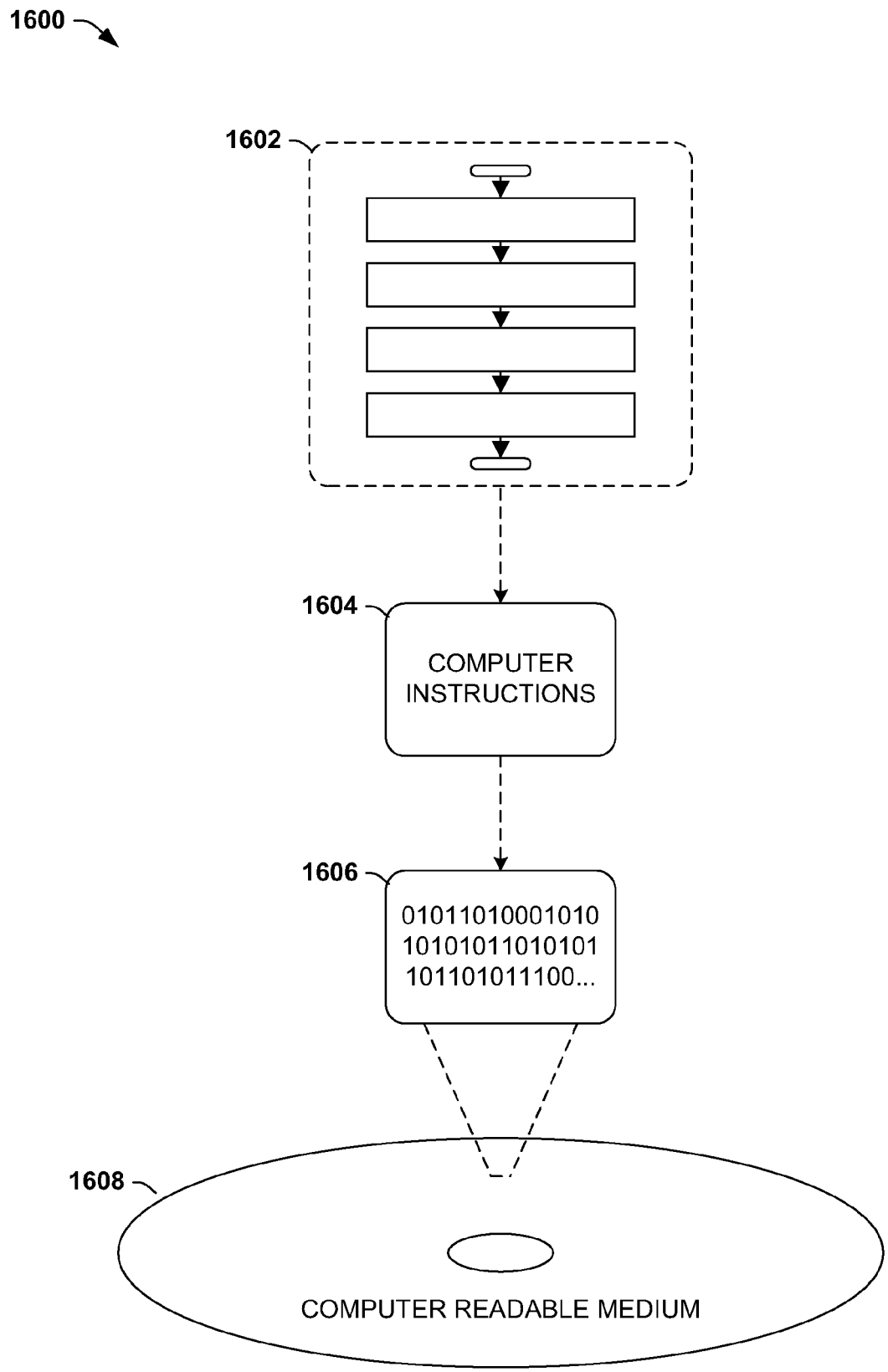
FIG. 16 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 16, wherein the implementation 1600 comprises a computer-readable medium 1608 (e.g., a CD-R, DVD-R, or a platter of a hard disk drive), on which is encoded computer-readable data 1606. This computer-readable data 1606 in turn comprises a set of computer instructions 1604 configured to operate according to one or more of the principles set forth herein. In one such embodiment 1600, the processor-executable instructions 1604 may be configured to perform a method 1602, such as the exemplary method 300 of FIG. 3, for example. In another such embodiment, the processor-executable instructions 1604 may be configured to implement a system, such as the exemplary system 1200 of FIG. 12, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 17:
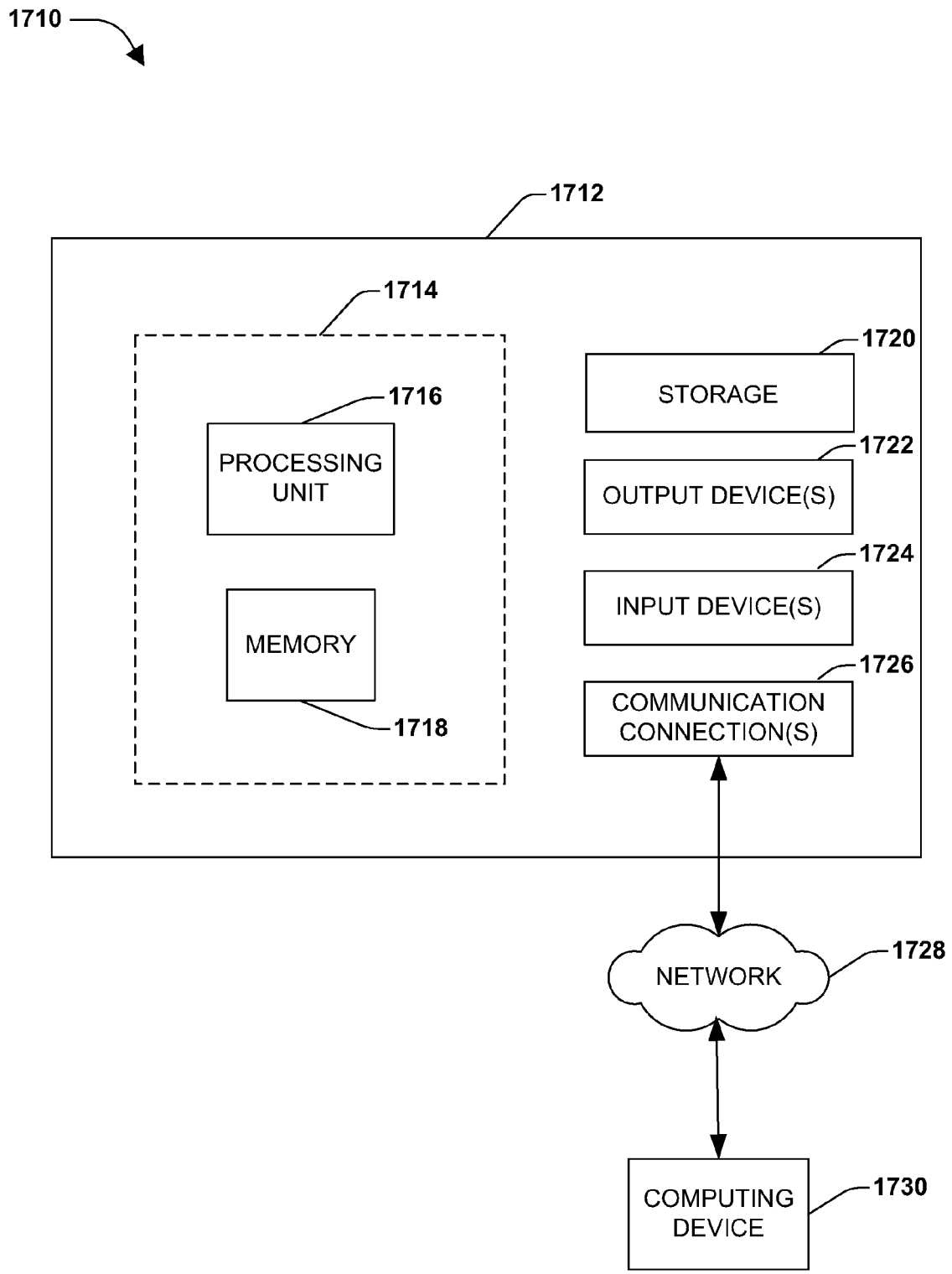
FIG. 17 illustrates an exemplary computing environment wherein one or more of the provisions set forth herein may be implemented.

FIG. 17 and the following discussion provide a brief, general description of a suitable computing environment to implement embodiments of one or more of the provisions set forth herein. The operating environment of FIG. 17 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 17 illustrates an example of a system 1700 comprising a computing device 1712 configured to implement one or more embodiments provided herein. In one configuration, computing device 1712 includes at least one processing unit 1716 and memory 1718. Depending on the exact configuration and type of computing device, memory 1718 may be volatile (such as RAM, for example), non-volatile (such as ROM, flash memory, etc., for example) or some combination of the two. This configuration is illustrated in FIG. 17 by dashed line 1714.

In other embodiments, device 1712 may include additional features and/or functionality. For example, device 1712 may also include additional storage (e.g., removable and/or non-removable) including, but not limited to, magnetic storage, optical storage, and the like. Such additional storage is illustrated in FIG. 17 by storage 1720. In one embodiment, computer readable instructions to implement one or more embodiments provided herein may be in storage 1720. Storage 1720 may also store other computer readable instructions to implement an operating system, an application program, and the like. Computer readable instructions may be loaded in memory 1718 for execution by processing unit 1716, for example.

The term "computer readable media" as used herein includes computer storage media. Computer storage media includes volatile and nonvolatile, removable and non-removable media implemented in any method or technology for storage of information such as computer readable instructions or other data. Memory 1718 and storage 1720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1712. Any such computer storage media may be part of device 1712.

Device 1712 may also include communication connection(s) 1726 that allows device 1712 to communicate with other devices. Communication connection(s) 1726 may include, but is not limited to, a modem, a Network Interface Card (NIC), an integrated network interface, a radio frequency transmitter/receiver, an infrared port, a USB connection, or other interfaces for connecting computing device 1712 to other computing devices. Communication connection(s) 1726 may include a wired connection or a wireless connection. Communication connection(s) 1726 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1712 may include input device(s) 1724 such as keyboard, mouse, pen, voice input device, touch input device, infrared cameras, video input devices, and/or any other input device. Output device(s) 1722 such as one or more displays, speakers, printers, and/or any other output device may also be included in device 1712. Input device(s) 1724 and output device(s) 1722 may be connected to device 1712 via a wired connection, wireless connection, or any combination thereof. In one embodiment, an input device or an output device from another computing device may be used as input device(s) 1724 or output device(s) 1722 for computing device 1712.

Components of computing device 1712 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1712 may be interconnected by a network. For example, memory 1718 may be comprised of multiple physical memory units located in different physical locations interconnected by a network.

Those skilled in the art will realize that storage devices utilized to store computer readable instructions may be distributed across a network. For example, a computing device 1730 accessible via network 1728 may store computer readable instructions to implement one or more embodiments provided herein. Computing device 1712 may access computing device 1730 and download a part or all of the computer readable instructions for execution. Alternatively, computing device 1712 may download pieces of the computer readable instructions, as needed, or some instructions may be executed at computing device 1712 and some at computing device 1730.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for multi-scale viewing of a scrollable area in a display utilizing a scrollbar for zooming and panning the scrollable area, comprising:
    using input device events monitoring to monitor interaction with a scroll handle in the scrollable area of the display;
    upon detecting a scroll handle drag at least orthogonal to an orientation of the scroll handle in the scrollbar, activating a display area zooming function comprising:
        adjusting a scale of a viewbox of the display comprising:
            determining an orthogonal distance travelled in dragging the scroll handle; and
            rescaling the viewbox as a function of the orthogonal distance travelled comprising:
                if the scroll handle is dragged toward a center of the display, rescaling the viewbox by zooming out to display more content in the viewbox; and
                if the scroll handle is dragged away from the center of the display, rescaling the viewbox by zooming in to display more detail of content in the viewbox;
    upon detecting the scroll handle drag at least orthogonal to the orientation of the scroll handle in the scrollbar, activating a new displaybox function comprising:
        distinguishing an area of the display from a remainder of the display, the distinguished area corresponding to an area of the resealed viewbox that would be displayed upon detecting a release of the dragged scroll handle at a particular location within the display;
        scaling the distinguished area as a function of a zoom level of the resealed viewbox; and
        displaying a view of content of the distinguished area in the display behind a view of the viewbox; and
    upon detecting a release of the dragged scroll handle at the particular location within the display, changing the display to correspond to the content of the distinguished area.

2. The method of claim 1, upon detecting that the rescaled viewbox is zoomed out to an extent of the scrollable area of the display, deactivating the display area zooming function.

3. The method of claim 1, comprising detecting the scroll handle drag based upon cursor movement.

4. The method of claim 1, comprising detecting the scroll handle drag based upon input device movement.

5. The method of claim 1, rescaling the viewbox comprising one or more of:
    rescaling the viewbox from a vertical scroll handle to maintain a cursor between a vertical scrollbar comprising the vertical scroll handle and an outside vertical edge of the viewbox; and
    rescaling the viewbox from a horizontal scroll handle to maintain a cursor between a horizontal scrollbar comprising the horizontal scroll handle and an outside horizontal edge of the viewbox.

6. The method of claim 1, comprising adjusting a scale of the scroll handle in the scrollbar as a function of the zoom level of the rescaled viewbox.

7. The method of claim 6, adjusting the scale of the scroll handle comprising:
    increasing a size of the scroll handle based upon zooming out; and
    decreasing a size of the scroll handle based upon zooming in.

8. The method of claim 1, comprising adjusting a location of the scroll handle within the scrollbar based upon the detected scroll handle drag.

9. The method of claim 1, upon detecting the scroll handle drag, activating a semantic zoom function.

10. The method of claim 9, activating the semantic zoom function comprising:
    generating an index for the rescaled viewbox; and
    inserting one or more index pointers into the rescaled viewbox.

11. The method of claim 1, rescaling the viewbox comprising at least one of:
    if the scroll handle is dragged away from the center of the display beyond the scrollbar, continuing to zoom in to display more detail of content in the viewbox;
    if the scroll handle is dragged toward the center of the display, zooming in to display more detail of content in the viewbox, instead of zooming out;
    if the scroll handle is dragged away from the center of the display, zooming out to display more content in the viewbox, instead of zooming in and
    not activating the new displaybox function when the scroll handle is dragged toward the center of the display.

12. The method of claim 1, using input device events monitoring comprising using script code mouse events to monitor interaction with the scroll handle in the scrollable area of the display.

13. The method of claim 1, comprising detecting the scroll handle drag based upon mouse movement.

14. A system for multi-scale viewing of a scrollable area in a display comprising a scrollbar with a scroll handle, comprising:
    an input device event detector component configured to detect interaction with the scroll handle in the scrollable area in the display;
    a viewbox scaler component, operably coupled to the input device event detector component and configured to, upon detection of a scroll handle drag at least orthogonal to an orientation of the scroll handle in the scrollbar, rescale a viewbox of the display as a function of an orthogonal distance travelled in dragging the scroll handle, the viewbox scaler component comprising:
        a zoom out function component configured to rescale the viewbox by zooming out to display more content in the viewbox if the scroll handle is dragged toward a center of the display; and
        a zoom in function component configured to rescale the viewbox by zooming in to display more detail of content in the viewbox if the scroll handle is dragged away from the center of the display;

a new displaybox generator component, configured to:
  generate a distinguished area of the display from a remainder of the display, the distinguished area corresponding to an area of the rescaled viewbox that would be displayed upon detecting a release of the dragged scroll handle at a particular location within the display; and
  display a view of content of the distinguished area in the display behind a view of the viewbox in the display;
a displaybox scaler component configured to scale the distinguished area as a function of a zoom level of the rescaled viewbox; and
a display area adjuster component, operably coupled to the input device event detector component and configured to change the display to correspond to the content of the distinguished area upon detection of a release of the scroll handle at the particular location within the display.

15. The system of claim 14, the input device event detector component configured to detect the scroll handle drag based upon cursor movement.

16. The system of claim 14, the input device event detector component configured to detect the scroll handle drag based upon input device movement.

17. The system of claim 14, the input device event detector component comprising a mouse events detector configured to detect one or more mouse events.

18. The system of claim 14, comprising a semantic zoomer component configured to manipulate the viewbox to facilitate visual differentiation of content in the rescaled viewbox.

19. The system of claim 18, the semantic zoomer component configured to insert one or more pointers in the resealed viewbox to facilitate visual differentiation.

20. A computer storage media comprising computer readable instructions configured to allow multi-scale viewing of a scrollable area in a display utilizing a scrollbar for zooming and panning the scrollable area, which when executed on a computing device, causes the computing device to perform a method comprising:
  using input device events monitoring to monitor interaction with a scroll handle in the scrollable area of the display;
  upon detecting a scroll handle drag at least orthogonal to an orientation of the scroll handle in the scrollbar, activating a display area zooming function comprising:
    adjusting a scale of a viewbox of the display comprising:
      determining an orthogonal distance travelled in dragging the scroll handle; and
      rescaling the viewbox as a function of the orthogonal distance travelled comprising:
        if the scroll handle is dragged toward a center of the display, rescaling the viewbox by zooming out to display more content in the viewbox; and
        if the scroll handle is dragged away from the center of the display, rescaling the viewbox by zooming in to display more detail of content in the viewbox;
  upon detecting the scroll handle drag at least orthogonal to the orientation of the scroll handle in the scrollbar, activating a new displaybox function comprising:
    distinguishing an area of the display from a remainder of the display, the distinguished area corresponding to an area of the rescaled viewbox that would be displayed upon detecting a release of the dragged scroll handle at a particular location within the display;
    scaling the distinguished area as a function of a zoom level of the rescaled viewbox; and
    displaying a view of content of the distinguished area in the display behind a view of the viewbox; and
  upon detecting a release of the dragged scroll handle at the particular location within the display, changing the display to correspond to the content of the distinguished area.

* * * * *